Patented June 27, 1950

2,512,625

UNITED STATES PATENT OFFICE 2,512,625

COMPOSITIONS COMPRISING POLYMERIC TRIAZOLES DISSOLVED IN OXYNITRILES

James Wotherspoon Fisher and Edward William Wheatley, Spondon, near Derby, and Geoffrey William Ison Sheavyn, Warwickshire, England, assignors to Celanese Corporation of America, a corporation of Delaware No Drawing. Application October 8, 1946, Serial No. 702,062. In Great Britain October 12, 1945

10 Claims. (Cl. 260—32.4)

This invention relates to improvements in polymer compositions, and is more particularly concerned with novel solutions of polymers and methods of utilising the said solutions.

In U. S. applications S./Nos. 662,628 and 609,031, filed April 16, 1946, and August 4, 1945, respectively, there is described a new series of polymers containing triazole rings in their structural units, and specifically 1.2.4-triazole rings. The specifications describe polymers containing not only the simple triazole ring but 4-amino-1.2.4-triazole nucleus and other substitution products of the simple triazole ring. A number of methods are described for making such polymers, including the condensation of dihydrazides and the condensation of dicarboxylic acids or their esters or nitriles with hydrazine. As is indicated in the said specifications, products of widely varying molecular weight may be produced, including molecular weights sufficiently high for the polymers to be useful for filament and film formation. Acetic and formic acids and phenolic bodies are indicated as suitable solvents for working up the products, and in addition it is indicated that the polymers may be shaped from the melt with or without the aid of plasticizers, for example phenolic plasticizers, urea plasticizers and sulphonamide plasticizers.

We have now found that the above polymers, and particularly those containing 4-amino-1.2.4-triazole rings in their structural units, are readily soluble in oxy-nitriles, and particularly alpha-oxy-nitriles which are generally termed cyanhydrins and may be formed by addition of hydrocyanic acid to aldehydes and ketones. Particularly useful solvents are formaldehyde cyanhydrin, acetaldehyde cyanhydrin and acetone cyanhydrin. These solvents are capable of forming dopes which even in the cold are clear and which range from moderately viscous solutions to gels according to the concentration. The actual process of dissolving the polymers in the solvents may be accelerated by warming or heating. Solution, however, occurs quite readily at room temperature. There appears to be no tendency towards solidification of the solutions on standing. Ethylene cyanhydrin, a beta-nitrile, readily dissolves the polymers, especially those containing 4-amino-1.2.4-triazole rings in their structural units, on warming, and solutions in this compound deposit polymer only on prolonged standing at room temperature, the life of the solution being shorter as its concentration is increased. There is rendered available a new range of solvents which may be utilised for the purpose of forming the polytriazoles into filaments, films or other shaped articles and to render them applicable as lacquers, coating compositions or the like.

The polymers may be dissolved in the new solvents with or without other solvents, for example those referred to in U. S. applications S. Nos. 662,628 and 609,031, filed April 16, 1946, and August 4, 1945, respectively, and 662,627, filed April 16, 1946, to any desired concentration, ranging, for example, from about 5% for fabric finishes up to 15, 20 or 25% or more for the production of films and filaments. For the application of the solutions, any of the usual additions may be made, for example plasticisers for the production of lacquers, coating compositions and films, and also dyestuffs, pigments, diluents, and other polymers, including resins and cellulose derivatives which are soluble in the solvents.

We have further found that particularly useful diluents for the solutions of the above-mentioned polymers in oxy-nitriles are aliphatic alcohols and/or organic compounds containing halogen atoms, particularly aliphatic halogenated hydrocarbons. Examples of such diluents are methyl and ethyl alcohols, chloroform and methylene and ethylene dichlorides. These diluents can be incorporated in high proportions in solutions of the polymers particularly in the alpha-oxy-nitriles, without causing precipitation of the polymers, and, being in most cases considerably cheaper than the oxy-nitriles, render it possible to reduce the cost of the solutions. The solutions containing such diluents may be produced either by dissolving the polymers directly in the mixtures of the oxy-nitriles and the diluents or by first dissolving the polymers in the oxy-nitriles and then incorporating the required amounts of diluents.

In the application of the new solutions to the production of lacquers, films and coatings, for example on wood, metal, fabrics and the like, simple application of the solution to the article, followed by drying, is usually sufficient, though subsequent heating or even baking may be applied if desired.

For the production of films and filaments, dry methods, that is to say methods in which the solvent medium is evaporated or decomposed by heat, may be applied, but the invention also includes the removal of the solvent medium from the film or filament by wet methods, that is to say by extruding the solution into a coagulating bath consisting of a non-solvent or mixture which does not precipitate the polymer too rapidly but which, on the contrary, has the property of gelling the polymer to some extent. Acetone or other ketones, alcohols in the case of alcohol-insoluble polytriazoles, dioxane, esters or mixtures of any of the above with one another or with water are suitable as coagulating bodies. Water itself is rather too rapid a precipitant. However, the admixture of a rapid precipitating non-solvent with a proportion of a solvent, including the new cyanhydrin solvents, frequently gives the desired properties to the coagulating bath. To obtain the maximum draw-down with filaments spun into a bath containing such a mixture, the solvent is best used in a proportion not far short of that at which no precipitation occurs, for example a concentration 5% short of that value.

The following examples illustrate the invention:

Example 1

A polymer containing amino-triazole rings in its structural units and having an intrinsic viscosity about 0.5 prepared from sebacic dihydrazide and free hydrazine, in accordance with U. S. application S. No. 609,031, filed Aug. 4, 1945, is dissolved in twice its weight of acetaldehyde cyanhydrin. The polymer readily dissolves at room temperature and no precipitation occurs on allowing the solution to stand. A strong clear film is obtained by painting the solution on to glass and gently drying in an oven at 100–110° C. The film, which shows marked adherence to the surface of the glass, shows no tendency towards blanching or precipitation. In the same way a film may be formed on a metal surface.

Example 2

The same polymer is dissolved in four times its weight of acetone cyanhydrin at room temperature to give a clear viscous dope. A film is cast on a glass surface as in Example 1, and again shows strong adherence to the glass. Cotton fabric is impregnated with the solution and then dried in an oven at 100–110° C. The resulting product is much more resistant to water than the original fabirc.

Example 3

The same polymer is disintegrated in 2.5 times its weight of ethylene cyanhydrin. Solution does not appear to take place readily at room temperature, but on warming gently solution begins and at a temperature of 80° C. all the polymer readily dissolves to make a clear viscous dope which deposited polymer only on prolonged standing at room temperature. A strong clear film is formed by painting the dope in a thin layer on glass and drying in an oven at 110° C.

Example 4

One part of the same polymer is dissolved in 1.2 parts by weight of acetaldehyde cyanhydrin at room temperature to form a viscous solution. 4.5 parts by weight of methanol is then slowly added to this solution, with constant stirring, to yield a clear, film forming dope.

Example 5

One part of the same polymer is dissolved in 1.5 parts by weight of acetaldehyde cyanhydrin, and 6 parts by weight of chloroform is then stirred in to form a clear, film-forming dope.

Example 6

One part of the same polymer is dissolved in an equal weight of acetaldehyde cyanhydrin, and 3.4 parts by weight of ethylene dichloride is then stirred in to form a clear, film-forming dope. Dopes are also made by dissolving one part of the polymer in 3 parts by weight of a 73/27 w./w. mixture of ethylene dichloride and acetaldehyde cyanhydrin, and in 2.7 parts by weight of a 70/30 w./w. mixture of the same compounds.

Having described our invention, what we desire to secure by Letters Patent is:

1. Compositions comprising a linear poly-1.2.4-triazole and, as solvent, an oyxnitrile.
2. Compositions comprising a linear poly-4-amino-1.2.4-triazole and, as solvent, an oxynitrile.
3. Compositions comprising a linear poly-octamethylene-4-amino-1.2.4-triazole and, as solvent, an oxynitrile.
4. Compositions comprising a linear poly-4-amino-1.2.4-triazole and, as solvent, an α-oxynitrile.
5. Compositions comprising a linear poly-octamethylene-4-amino-1.2.4-triazole and, as solvent, an α-oxynitrile.
6. Compositions comprising a linear poly-4-amino-1.2.4-triazole, as solvent an α-oxynitrile, and an organic non-solvent diluent.
7. Compositions comprising a linear poly-4-amino-1.2.4-triazole, as solvent an α-oxynitrile and as diluent an alcohol containing at the most two carbon atoms.
8. Compositions comprising a linear poly-4-amino-1.2.4-triazole, as solvent an α-oxynitrile and as diluent an aliphatic halogenated hydrocarbon containing at the most two carbon atoms, a plurality of chlorine atoms and at least one hydrogen atom.
9. Compositions comprising a linear poly-4-amino-1.2.4-triazole, as solvent an α-oxynitrile and as diluent methyl alcohol.
10. Compositions comprising a linear poly-4-amino-1.2.4-triazole, as solvent an α-oxynitrile and as diluent ethylene chloride.

JAMES WOTHERSPOON FISHER.
EDWARD WILLIAM WHEATLEY.
GEOFFREY WILLIAM ISON SHEAVYN.

REFERENCES CITED

The following references are of record in the file of this patent:

UNITED STATES PATENTS

| Number | Name | Date |
|---|---|---|
| 2,395,642 | Prichard | Feb. 26, 1946 |
| 2,415,193 | Rogers | Feb. 4, 1947 |